United States Patent [19]

Gregory et al.

[11] Patent Number: 5,160,171
[45] Date of Patent: Nov. 3, 1992

[54] SECURITY CODING

[75] Inventors: Peter Gregory, Bolton; Arthur Quayle, Holcombe Brook, both of England

[73] Assignee: Imperial Chemical Industries PLC, London, England

[21] Appl. No.: 652,260

[22] Filed: Feb. 6, 1991

Related U.S. Application Data

[63] Continuation of Ser. No. 332,597, Apr. 3, 1989, abandoned.

[30] Foreign Application Priority Data

Apr. 5, 1988 [GB] United Kingdom ............ 8807937
Oct. 17, 1988 [GB] United Kingdom ............ 8824293

[51] Int. Cl.$^5$ .............................................. B42D 15/00
[52] U.S. Cl. ...................................... 283/91; 283/94; 427/7; 427/145; 427/160; 427/288
[58] Field of Search ............... 427/7, 160, 288, 145; 283/91, 88

[56] References Cited

U.S. PATENT DOCUMENTS

| | | | |
|---|---|---|---|
| 3,933,094 | 1/1976 | Murphy et al. | 283/74 |
| 4,230,344 | 10/1980 | Bell et al. | 283/83 |
| 4,425,421 | 1/1984 | Rutges et al. | 282/112 |
| 4,605,846 | 8/1986 | Duret et al. | 283/901 |
| 4,626,445 | 12/1986 | Dobrowolski et al. | 427/7 |
| 4,627,819 | 12/1986 | Burrows | 283/88 |
| 4,663,518 | 5/1987 | Borror et al. | 283/77 |

FOREIGN PATENT DOCUMENTS 1178321 1/1970 United Kingdom .
2090194 7/1982 United Kingdom .

OTHER PUBLICATIONS

"Printed Documents and the Detection of Markings Thereon", Research Disclosure, No. 160 (1977) p. 80.

Primary Examiner—Janyce Bell
Attorney, Agent, or Firm—Cushman, Darby & Cushman

[57] ABSTRACT

A method of security coding an article which comprises applying to the article an identification mark comprising at least one colorless or weakly-colored infra-red absorbing material and an article carrying one or more identification codes applied according to the method. The method is suitable for marking documents, currency and equivalents, such as cheques, credit cards and tickets, and for the identification of copyright materials and high valued added goods, such as tapes, cassettes, books, films, cameras, perfumes, spirits and designer goods to inhibit counterfeiting.

13 Claims, No Drawings

SECURITY CODING

This is a continuation of application Ser. No. 07/332,597, filed on Apr. 3, 1989, which was abandoned.

This specification describes an invention relating to security coding.

According to the present invention there is provided a method of security coding an article which comprises applying to the article an identification mark (hereinafter referred to as the "i-r mark") comprising a colourless or weakly-coloured infra-red absorbing material (hereinafter referred to as the "i-r absorber").

The i-r mark may be formed by simply applying the infra-red absorber to the surface of the article, preferably as an ink which dries to leave a printed image containing the i-r absorber. The image can be in any shape, irregular or regular (e.g. a square or triangle), which will give a response when scanned by an i-r scanner/detector, such as a laser scanner and diode detector. The i-r mark is, however, preferably in the form of a code, such as an alphanumeric, a word or, more especially, a bar code. The code will preferably identify the origin of the article, and/or provide other relevant information about it, when addressed with an appropriately programmed i-r bar code reader.

If the i-r mark is printed with an ink containing only colourless ingredients, e.g. a colourless i-r absorber and a colourless binder, it will be invisible to the eye in normal white light and be detectable only by an i-r detector.

If the i-r absorber is weakly coloured, i.e. it has a slight absorption in the visible region of the spectrum, the i-r mark may be, and preferably is, disguised by means of an i-r transparent background or foreground, such as an visually opaque i-r transparent coating e.g. a print with an ink containing a colorant (dye or pigment) with sufficient absorption in the visible region of the spectrum to render the i-r mark non-detectable by the human eye. However, as the "disguised" i-r mark is not visible to the human eye, it will be difficult to locate unless its position on the article is signalled in a visible manner. Thus, the position of such a "disguised" i-r mark is preferably indicated in a visible manner, e.g. by location within a coloured border. Naturally, an invisible i-r absorber can be treated in the same manner. The visually opaque coating may itself comprise an image, such as a block of colour, a logo, a pattern or a picture which is applied to the surface of the article, before or after application of the i-r mark.

The disguised i-r mark is preferably in the form of an i-r bar code incorporating coded information which will identify the origin of the article, and/or provide other relevant information, when addressed with an appropriately programmed i-r bar code reader.

In a further feature of the present invention there is provided a variant of the above method in which i-r mark comprises in addition to the i-r absorber, a colorant having a significant absorption in the visible region of the spectrum.

The colorant preferably has an absorption which is stronger than that of the i-r absorber at all wavelengths in the region from 400–700 nm so that any slight absorption by the i-r absorber within this range is hidden by the stronger absorption of the colorant.

The colorant preferably comprises a dye or a pigment and is preferably incorporated into the same ink as the i-r absorber so as to provide a coloured identification mark (hereinafter referred to as the "coloured i-r mark") on the article. As the coloured i-r mark can be detected by an i-r detector the colorant does not need to contribute to the detectability of the mark and can be matched to the colour of the article in the immediate surroundings of the mark so that the mark is more aesthetically pleasing, yet visibly recognisable as an identification mark to the human eye. An additional advantage of the coloured i-r mark is that it is difficult to reproduce because photocopying will not reproduce the i-r element of the mark and a counterfeit mark, produced by mere visual reproduction of the original, e.g. by photocopying or even colour printing, will be detectable by the absence of a response when it is scanned with an i-r detector. Such a method is particularly useful for the preparation of coloured, coded i-r marks, especially coloured bar codes. A bar code formed with an ink comprising a colorant and an i-r absorber is an preferred species of the first preferred feature of the present invention.

In a second preferred feature of the present invention the i-r mark comprises a specific mixture of i-r absorbers having different spectral responses, so that the mixture has a unique response, providing a "fingerprint" spectral pattern and thus a unique identity for the marked article. If the i-r mark is in the form of a bar code, such a unique i-r bar code can be used in conjunction with a programmed bar-code reader to produce a response only if it detects the "fingerprint" spectral pattern associated with the specific mixture of i-r absorbers. A detector, tuned to the unique spectral response of the mixture will detect a counterfeit by the absence of a part of the spectral response, unless the counterfeit i-r mark comprises the specific mixture of i-r absorbers used in the genuine i-r mark.

According to a further feature of the present invention there is provided a method of security coding articles which comprises applying to the article a first coded i-r mark and a second coded identification mark comprising a colorant, hereinafter referred to as the "coded colour mark".

The coded i-r mark is preferably printed with an ink containing an i-r absorber which has an insignificant absorption in the visible region of the spectrum so that it is substantially invisible to the eye in normal white light. If, however, the i-r absorber has a small absorption in the visible region of the spectrum, so that it is detectable to the human eye, it may be, and preferably is, disguised by means of an i-r transparent background or foreground, such as an visually opaque i-r transparent coating e.g. a print with an ink containing a colorant (dye or pigment) with sufficient absorption in the visible region of the spectrum to render the coded i-r mark invisible to the eye, as hereinbefore described.

The coded colour mark can be formed with any convenient ink which gives a visible printed pattern capable of being read by an appropriately programmed "visible" detector. If the coloured bar code also absorbs in the i-r region of the spectrum, e.g. it is printed with carbon black, it may be detected using a differently programmed i-r detector, or the two coded marks may be read simultaneously.

However a preferred coded colour mark is free from any components which have a significant absorption over the range of the i-r spectrum covered by i-r absorber in the coded i-r mark formed, for example, by printing with an ink which is free from such components. This allows the coded colour mark to overlap the coded i-r mark, preferably by over-printing the coded i-r mark with the coded colour mark. Such overprinting is generally sufficient to hide or disguise the coded i-r mark or to render it indecipherable by visual inspection, even when the i-r absorber in the coded i-r mark is visible to the eye on account of its slight absorption in the visible region of the spectrum. However, where the i-r absorber is detectable by the human eye, it is preferable to disguise the coded i-r mark by applying it to, or covering it with, a coloured background or foreground, which prevent visual detection of the i-r mark, in addition to overprinting with the code colour mark.

Both the coded i-r mark and the coded colour mark are preferably bar codes such as are applied to a wide variety of goods to indicate the origin, type, class, quality, etc. of the article.

The colourless or weakly coloured i-r absorber used in the present invention preferably has a significant absorption in the near i-r region from 700 to 1500 nm more preferably from 700 to 1200 nm and especially from 750 to 1000 nm. Such an i-r absorber is distinguished from conventional materials used in laser-scanned i-r absorbing bar-codes, such as carbon black, which are generally strongly coloured in addition to having a significant absorption in the i-r region of the spectrum. The i-r absorber preferably has a very low absorption in the visible region of the spectrum so that it is barely detectable by the eye when present in sufficient amount to give a strong absorption or reflectance signal in the i-r region. A preferred i-r absorber has an absorption in the visible region of the spectrum, from 400-700 nm, which is not more than 40%, and especially not more than 20%, of the absorption in the near i-r region of the spectrum, 700-1500 nm, as determined by the areas under the absorption curves in these regions of the spectrum.

Examples of i-r absorbers for use in the present invention are disclosed in an article by M. Sumitani in Kagaku Kogyo, May 1986 pages 379-89. These include nitroso compounds, cyanines, imminium and dimminium compounds, squarilium and croconium compounds, metal dithiolenes, quinones, phthalocyanines, azos, indoanilines and donor-acceptor molecules. However, preferred compounds, because of their pale or zero coloration are (i) metal dithiolenes such as are disclosed in EP 135 995A, Research Disclosure No 21612, April 1982, U.S. Pat. No. 3,875,199 GB 1,297,492, U.S. Pat. No. 3,999,838, Mol Cryst, Liq Cryst Vol 56 pp 225-8, Mol Cryst, Liq Cryst Vol 41 pp 11-3, Mol Cryst, Liq Cryst 1980 56 pp 249-55 and Tetrahedron 1982 18(17) pp 2715-20, (ii) bisazo compounds having a central thiophene or thiazole component linked through an azo group to phenyl group carrying at least two electron-withdrawing groups, such as are described in EP 280434, (iii) squarilium compounds, and more especially (iv) (substituted-thio)phthalocyanines such as those disclosed in EP 155 780, EP 282181 and EP 282182.

Examples of especially preferred i-r absorbers (IRA) are the substituted phthalocyanines:

IRA1 hepta-(4-methylphenylthio)-tetra-1-amino-2-thiophenylene)-CuPc

IRA2 decasulpho-hepta-(4-methylphenylthio)-tetra-1-amino-2-thiophenylene)-CuPc

IRA3 dodecasulpho-pentadeca-(4-methylphenylthio)-CuPc

IRA4 decasulpho-penta-(2-aminophenylthio)-penta-(1-amino-2-thiophenylene)-CuPc

IRA5 1,1,3,3-tetramethylbutylammonium salts of (2) and (4)

IRA6 1,3-di(2-tolyl)guanidinium salt of (3)

IRA7 pentadeca-(4-methylphenylthio)-CuPc

The bar-coding method of the present invention is suitable for the marking of secure documentation, currency and equivalents such as cheques and credit cards and identification papers such as passports, identity cards and tickets, for the protection of copyright materials and trademarks, by incorporating infra-red bar codes into logos and copyright material, such as tapes, cassettes, books and films and labels for affixing to these, and to high valuable articles, such a spirits, perfumes, designer goods, cameras etc to inhibit counterfeiting.

The invention is further illustrated by the following examples in which all parts and percentages are by weight.

EXAMPLE 1

An ink was made by dissolving 1 part of IRA3, described above, in a mixture of 60 parts of water, 30 parts of diethylene glycol and 10 parts of N-methylpyrrolidone. The ink was applied to a sheet of paper in the form of a bar code using an ink-jet printer. The image on the paper was a very pale beige which was only just detectable by the eye and could not be read by a standard visible bar code reader detecting at a wavelength of 630 nm. It could, however, be read and deciphered by an i-r bar code reader detecting at 780-800 nm.

EXAMPLE 2

The bar code prepared in Example 1 was completely covered by overprinting with an ink consisting of 3 parts of CI Direct Black 168 dissolved in a mixture of 60 parts of water, 30 parts of diethylene glycol and 10 parts of N-methylpyrrolidone, also applied by ink jet printer. The i-r bar code could not be reproduced by photocopying or detected by visual inspection but could be read and deciphered with an i-r bar code reader detecting at 780-800 nm. The same result was achieved when the CI Direct Black 168 was replaced with the same amount of CI Acid Red 249 or CI Direct Yellow 86.

EXAMPLE 3

To the ink described in Example 1 was added 3 parts of CI Direct Yellow 86. This yellow i-r ink was printed in the form of a bar code on a plain paper using an ink jet printer. The bar code could be read and deciphered using an i-r bar code reader detecting at 780-800 nm and was also visible to the eye but could not be read and deciphered by a visible bar code reader detecting at 630 nm. However, a visually identical bar.code printed with the ink described in this Example, from which the i-r absorber had been omitted, could not be read by either the visible or the i-r bar code reader. The same result was achieved when the CI Direct Yellow 86 was replaced by the same amount of CI Acid Red 249.

EXAMPLE 4

A bar code was overprinted, with the i-r ink described in Example 1, in the coloured background of a well-known logo. It could not be detected visually against the shade (CI Direct Blue 199) of the background but could be read and deciphered with a bar code reader detecting at 780-800 nm.

EXAMPLE 5

The bar code described in Example 1 was overprinted with a different black bar code using the black ink described in Example 2. The faint i-r bar code could not be read by eye because it was partly obscured by the black bar code. The black bar code was read and deciphered with a visible bar code reader detecting at 630 nm and the i-r bar code was read and deciphered with an i-r bar code reader detecting at 780-800 nm. However, the i-r bar code could not be read with the visible bar code reader and vice-versa. A photocopy (carbon black image) of the bar code had a similar visual appearance to the original but both the visible and i-r bar code readers read and deciphered only the image of the original black bar code. The absence of the i-r bar code from the photocopy established that it was a copy and not the original.

We claim:

1. A method of security coding an article comprising the steps of:
   (i) applying to the article an identification mark comprising at least one colorless or weakly colored infra-red absorbing material; and
   (ii) disguising said material by means of a visually opaque infra-red transparent foreground.

2. A method according to claim 1 wherein said infra-red absorbing material is applied as a bar code.

3. A method according to claim 1 wherein said foreground is a print with an ink containing a colorant having sufficient absorption in the visible region of the spectrum to render said material non-detectable to the human eye.

4. A method of security coding an article comprising the steps of:
   (i) applying to the article an identification mark containing at least one colorless or weakly colored infra-red absorbing material; and
   (ii) disguising said material by means of a visually opaque infra-red transparent print with an ink containing a colorant; wherein said colorant has an absorption which is stronger than that of said material at all wavelengths in the region 400-700 nm such that any slight absorption by said material within said region is hidden by the stronger absorption of the colorant.

5. A method according to claim 1 wherein said material comprises at least two infra-red compounds having different spectral responses.

6. A method according to claim 4 wherein said material comprises at least two infra-red compounds having different spectral responses.

7. A method according to claim 2 wherein said material is a mixture of infra-red absorbants having a fingerprint spectral pattern which is detectable by a programmed bar-code reader responsive to that spectral pattern.

8. An article security coded with a colorless or weakly colored infra-red absorbant identification mark disguised by means of a visually opaque infra-red transparent foreground.

9. An article according to claim 8 wherein said mark is in the form of a bar code.

10. An article according to claim 8 wherein said foreground is a print with an ink containing a colorant having sufficient absorption in the visible region of the spectrum to render said material non-detectable to the human eye.

11. An article security coded with a colorless or weakly colored infra-red absorbant identification mark disguised by means of a visually opaque infra-red transparent print with an ink containing a colorant, wherein said colorant has an absorption which is stronger than that of said material at all wavelengths in the region 400-700 nm such that any slight absorption by said material within said region is hidden by the stronger absorption of the colorant.

12. An article according to claim 11 wherein said mark is in the form of a bar code.

13. An article according to claim 11, which article is a credit card, currency, cheque, passport, identity card, ticket, or label.

* * * * *